US008111249B2

(12) United States Patent
Hu

(10) Patent No.: US 8,111,249 B2
(45) Date of Patent: Feb. 7, 2012

(54) IMPULSE-TYPE DRIVING METHOD AND CIRCUIT FOR LIQUID CRYSTAL DISPLAY

(75) Inventor: Yu-Tsung Hu, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1002 days.

(21) Appl. No.: 12/046,436

(22) Filed: Mar. 11, 2008

(65) Prior Publication Data

US 2009/0189836 A1 Jul. 30, 2009

(30) Foreign Application Priority Data

Jan. 29, 2008 (TW) ................................ 97103281 A

(51) Int. Cl.
*G06F 3/038* (2006.01)

(52) U.S. Cl. .............. 345/204; 345/87; 345/94; 345/96; 345/99

(58) Field of Classification Search .................... 345/87, 345/94, 96, 99, 204–205
See application file for complete search history.

(56) References Cited

U.S. PATENT DOCUMENTS

| | | | | |
|---|---|---|---|---|
| 7,142,787 | B2 * | 11/2006 | Horiuchi et al. | 398/154 |
| 7,639,244 | B2 * | 12/2009 | Ku et al. | 345/204 |
| 7,705,841 | B2 * | 4/2010 | Lin | 345/208 |
| 7,755,588 | B2 * | 7/2010 | Chang | 345/98 |
| 7,800,413 | B2 * | 9/2010 | Lee et al. | 327/108 |
| 2007/0229434 | A1 * | 10/2007 | Liao | 345/98 |
| 2010/0149227 | A1 * | 6/2010 | Tomizawa et al. | 345/694 |

* cited by examiner

*Primary Examiner* — Richard Hjerpe
*Assistant Examiner* — Sahlu Okebato
(74) *Attorney, Agent, or Firm* — Jianq Chyun IP Office

(57) ABSTRACT

An impulse-type driving method for a liquid crystal display (LCD) is used for driving a pixel array of an LCD panel. The method includes providing a set of impulse control signals to a source driver. The source driver, according to the set of impulse control signals, drives the pixel array. The set of impulse control signals includes a command signal. The command signal includes a field of determining data voltage polarity and a command field. According to a time sequence, the field of determining data voltage polarity provides a polarity data for determining a voltage polarity output by the source driver. The command field and the field of determining data voltage polarity are consecutively and alternatively output, in which the command field allows to add a dynamic command in accordance with a desired action.

24 Claims, 12 Drawing Sheets

IMPULSE-TYPE DRIVING METHOD AND CIRCUIT FOR LIQUID CRYSTAL DISPLAY

CROSS-REFERENCE TO RELATED APPLICATION

This application claims the priority benefit of Taiwan application serial no. 97103281, filed on Jan. 29, 2008. The entirety the above-mentioned patent application is hereby incorporated by reference herein and made a part of specification.

BACKGROUND OF THE INVENTION

1. Field of the Invention

The present invention generally relates to a driving technique for a liquid crystal display (LCD), in particular, to a source driving and gate driving technique.

2. Description of Related Art

LCDs, especially thin film transistor (TFT) LCDs, have been widely utilized. Images on an LCD are displayed by a pixel array formed of a plurality of pixels, and each pixel displays a corresponding colour according to a time sequence of a frame. In order to drive the pixel display, various control signals are required, and usually a gate driver and a source driver are used to perform intersection control.

The conventional TFT LCD adopts a hold-type image display mode. Whenever a pixel voltage is written, a frame period is kept, but this display mode may lead to fuzzy dynamic images. Therefore, the conventional art then proposes an impulse-type driving technique to effectively eliminate the aforementioned defect.

FIG. 1 is a schematic view showing the architecture of a panel system of the conventional TFT LCD. Referring to FIG. 1, the TFT LCD has a display panel 100, and a pixel array constituted by a plurality of pixels 102 is formed on the display panel 100. In order to drive the pixels 102, generally the pixel grey-scale data to be displayed are input through a source driver 106. A gate driver 104 is used to activate scan lines in sequence, such that the pixels will display the pixel grey-scale data. The gate driver 104 and the source driver 106 are controlled by a timing controller 108.

FIG. 2 shows timing control of a conventional driving method. Referring to FIGS. 1 and 2, generally, the operation includes an interface with a data transmission mode of reduced swing differential signaling (RSDS) or mini-low-voltage differential signaling (mini-LVDS). The timing controller 108, for example, respectively sends a set of control signals 110 such as STH/TP/RVS timing control signals and the pixel data to the source driver 106, in which STH is particularly adopted for the RSDS transmission mode. In addition, the timing controller 108 also sends STV/CPV/OE and other timing control signals 112 to the gate driver 104, for sequentially controlling the voltage required by all the pixel capacitors on the TFT LCD panel 100, and the panel 100 shows different grey-scale variations according to different applied voltages. As shown in the figure, the input sequence of the pixel driving data is $p_n(x,y)$、$p_n(x+1,y)$、$p_n(x+2,y)$ . . . $p_n(x,y+1)$、$p_n(x+1,y+1)$、$p_n(x+2,y+1)$ . . . $p_{n+1}(x,y)$、$p_{n+1}(x+1,y)$、$p_{n+1}(x+2,y)$ . . . $p_{n+1}(x,y+1)$、$p_{n+1}(x+1,y+1)$、$p_{n+1}(x+2,y+1)$ . . . , that is, the input is carried out in sequence along a single direction. A detailed implementation of the above scan mode is that the source driver 106 is used to sequentially transmit synchronous signals in a horizontal direction and the gate driver 104 is used to sequentially transmit synchronous signals in a vertical direction, such that the horizontal synchronous signals of the source driver 106 and the vertical synchronous signals of the gate driver 104 are serially-connected by stages.

STH is a horizontal synchronous signal of the RSDS data type source driver. For the mini-LVDS data type, the horizontal synchronous signals of the source driver 106 are contained in the data. TP is a voltage output control signal of the source driver 106, and RVS is a voltage polarity designating signal of the source driver 106. STV is a vertical synchronous signal of the gate driver 104. CPV is a clock signal of the gate driver 104. OE is an output enable control signal. As shown in FIG. 1, OE is connected to all the gate drivers 104, so the output enables of all the gate drivers are the same.

However, in accordance with different driving mechanisms, the above driving manner is not the only feasible way. Those in the art continuously search for other more flexible driving manners to go with other different operating mechanisms.

SUMMARY OF THE INVENTION

Accordingly, the present invention is directed to an impulse-type driving method and a circuit architecture of a source driver and a timing generator. In addition, the present invention also provides a new system interface protocol, for example, a hardware architecture with low cost and low power consumption, but capable of implementing impulse-type driving without substantially raising the data transmission amount of the system.

An impulse-type driving method for an LCD is provided for driving a pixel array of an LCD panel. The method includes providing a set of impulse control signals to a source driver. The source driver is used to drive the pixel array according to the set of impulse control signals. The set of impulse control signals includes a command signal. The command signal includes a field of determining data voltage polarity and a command field. The field of determining data voltage polarity provides a polarity data for determining a voltage polarity output by the source driver output according to a time sequence. The command field and the field of determining data voltage polarity are consecutively and alternatively output, in which the command field allows to add a dynamic command in accordance with a desired action.

In the driving method according to an embodiment, a time point of the field of determining data voltage polarity is corresponding to a voltage output control signal of the source driver. Further, for example, the command field is located between two adjacent fields of determining data voltage polarity.

In the driving method according to an embodiment, the field of determining data voltage polarity is a dependent signal input.

In the driving method according to an embodiment, the command signal further includes a voltage output control field, for controlling the source driver to output an image data.

In the driving method according to an embodiment, the command field is used to set display brightness adjustment for a plurality of pixels in the pixel array respectively.

The driving method according to an embodiment further includes providing an output enable signal to a gate driver respectively, in which the output enable signal includes a first output enable and a second output enable to be alternatively output; and providing a vertical synchronous signal to the gate driver, in which the vertical synchronous signal includes a first vertical synchronous signal and a second vertical synchronous signal in a frame in accordance with a time sequence of the first output enable and the second output enable.

In the driving method according to an embodiment, the first output enable works when a picture content is transmitted, and the second output enable works when a voltage value is set.

An impulse-type driving circuit for an LCD is further provided for driving a pixel array of an LCD panel. The circuit includes a timing controller and a source driver. The timing controller provides a set of control signals including a clock signal, a voltage output control signal (TP) of a source driver, and a command signal. The command signal includes a field of determining data voltage polarity and a command field. The field of determining data voltage polarity provides a polarity data for determining a voltage polarity output by the source driver according to a time sequence. The command field and the field of determining data voltage polarity are consecutively and alternatively output, in which the command field allows to add a dynamic command in accordance with a desired action. The source driver receives the set of control signals, and unpacks the command signal to execute corresponding operations.

In the driving circuit according to an embodiment, for example, the timing controller includes a receiving interface unit for receiving and decoding an input data to obtain a data clock of the set of control signals, and a command circuit unit also for receiving the data clock to generate the set of control signals containing the command signal. Or, the command signal may be generated based on other clock sources (for example, internal or external clock generation units). That is, in the present invention, it is not limited that the command signal must be generated based on a data clock. The source driver includes a receiving interface unit for receiving the data clock transmitted by the timing controller for subsequent use, and a command detector for receiving the data clock and the command signal to generate a command enable signal.

In the driving circuit according to an embodiment, for example, the command circuit unit of the timing controller includes a command generator for receiving the data clock to generate a command content, and a control signal generator for receiving the data clock and the command content to correspondingly generate the command signal to the source driver.

In the driving circuit according to an embodiment, for example, the command circuit unit of the timing controller includes a first clock divider for dividing the data clock by a first parameter, so as to obtain a first down-conversion clock; a command generator for receiving the first down-conversion clock to generate a command content; a control signal generator for receiving the data clock to at least generate a data voltage polarity signal correspondingly; and a logic unit for receiving the command content and the data voltage polarity signal, and outputting the command signal after combination.

In the driving circuit according to an embodiment, for example, the command detector of the source driver further includes a second clock divider for dividing the received data clock by a second parameter, so as to obtain a second down-conversion clock as a basis for generating the command enable signal. Further, for example, the first parameter is greater than or equal to the second parameter.

In the driving circuit according to an embodiment, for example, the command circuit unit of the timing controller includes a first clock driver for dividing the data clock by a first parameter, so as to obtain a first down-conversion clock; a command generator for receiving the first down-conversion clock to generate a command content; a phase modulator for performing a phase modulation on the command content; a control signal generator for receiving the data clock to at least generate a data voltage polarity signal correspondingly; a logic unit for receiving the command content output by the phase modulator and the data voltage polarity signal output by the control signal generator, and outputting the command signal after combination.

In the driving circuit according to an embodiment, for example, the command detector of the source driver further includes a second clock divider for dividing the received data clock by a second parameter, so as to obtain a second down-conversion clock as a basis for generating the command enable signal. Further, for example, the first parameter is greater than or equal to the second parameter.

In the driving circuit according to an embodiment, for example, a time point of the field of determining data voltage polarity is corresponding to the TP signal of the source driver.

In the driving circuit according to an embodiment, for example, the command field is located between two adjacent fields of determining data voltage polarity.

In the driving circuit according to an embodiment, for example, the field of determining data voltage polarity is a dependent signal input.

In the driving circuit according to an embodiment, for example, the command signal further includes a voltage output control field for controlling the source driver to output an image data.

In the driving circuit according to an embodiment, for example, the command field is used to set display brightness adjustment for a plurality of pixels in the pixel array respectively.

In the driving circuit according to an embodiment, for example, the timing controller further provides an output enable signal to a gate driver respectively, in which the output enable signal includes a first output enable and a second output enable to be alternatively output; and provides a vertical synchronous signal to the gate driver, in which the vertical synchronous signal includes a first vertical synchronous signal and a second vertical synchronous signal in a frame in accordance with a time sequence of the first output enable and the second output enable.

In the driving circuit according to an embodiment, for example, the first output enable works when a picture content is transmitted, and the second output enable works when a voltage value is set.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
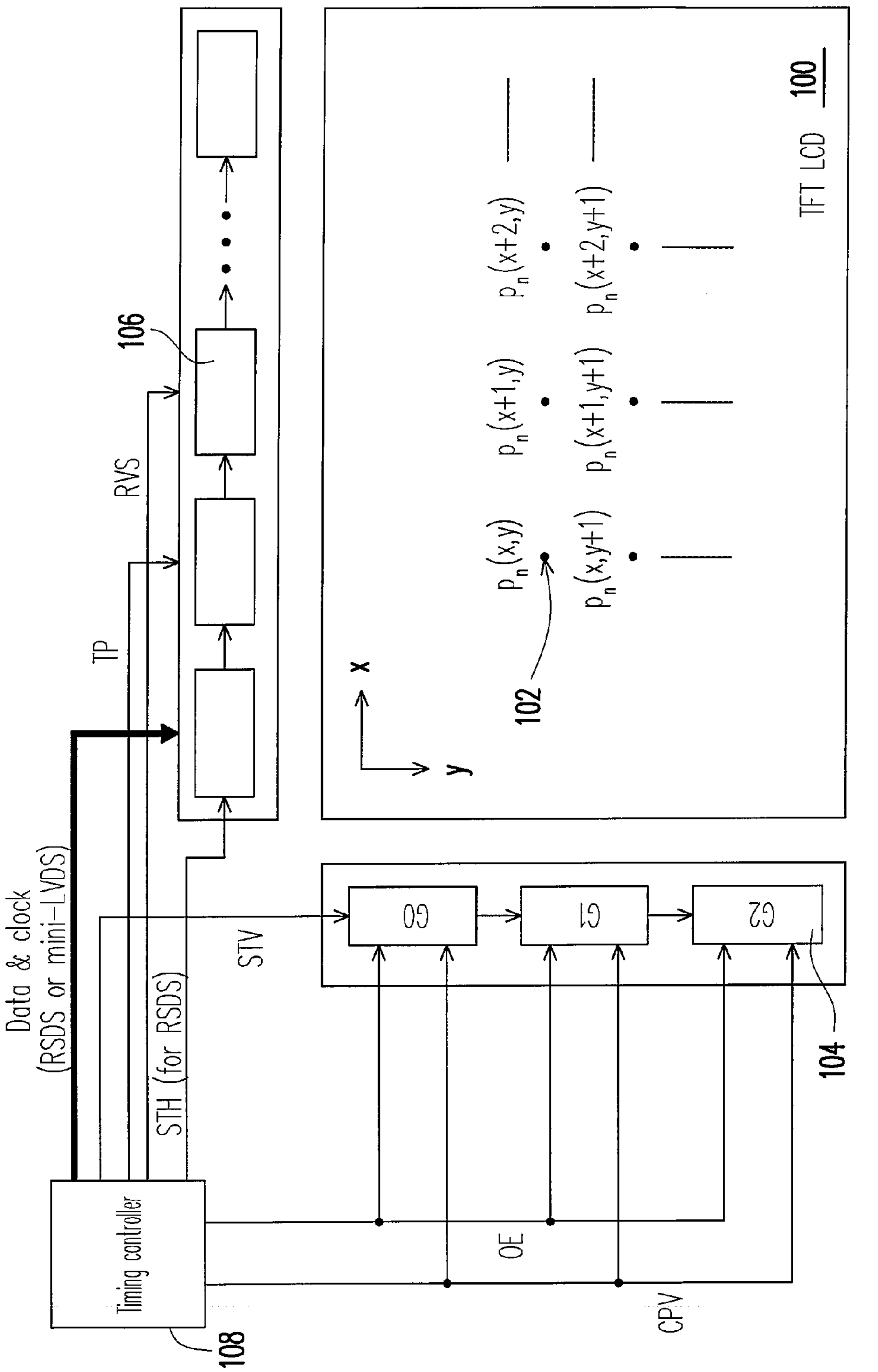
FIG. 1 (PRIOR ART)
FIG. 1 is a schematic view showing the architecture of a panel system of a conventional TFT LCD.
Figure 2:
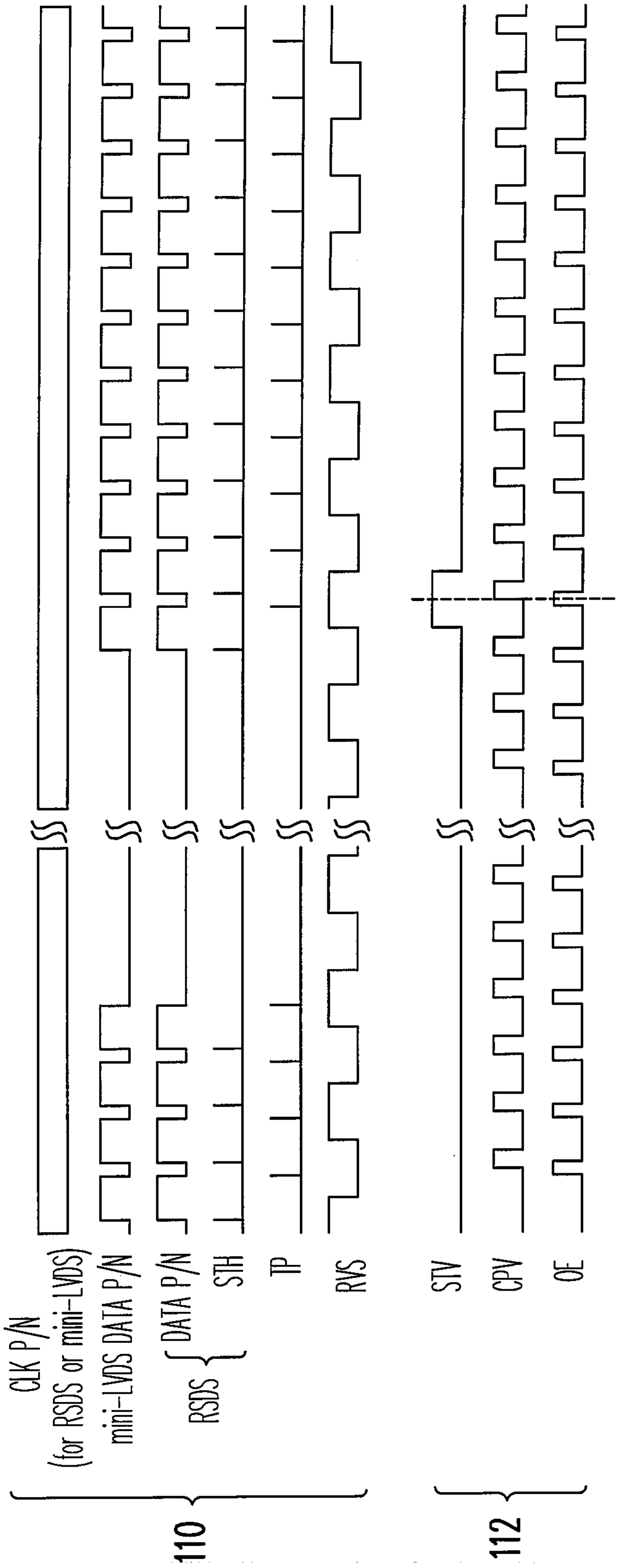
FIG. 2 (PRIOR ART)
FIG. 2 shows timing control of a conventional driving method.

Reference will now be made in detail to the present embodiments of the invention, examples of which are illustrated in the accompanying drawings. Wherever possible, the same reference numbers are used in the drawings and the description to refer to the same or like parts.

The present invention provides an impulse-type driving method and a circuit architecture of a source driver and a timing generator. In addition, the present invention also provides a new system interface protocol, for example, a hardware architecture with low cost and low power consumption, but capable of implementing impulse-type driving without substantially raising the data transmission amount of the system. Embodiments are given below for illustrating the present invention, and the present invention is not limited thereto.

Figure 3:
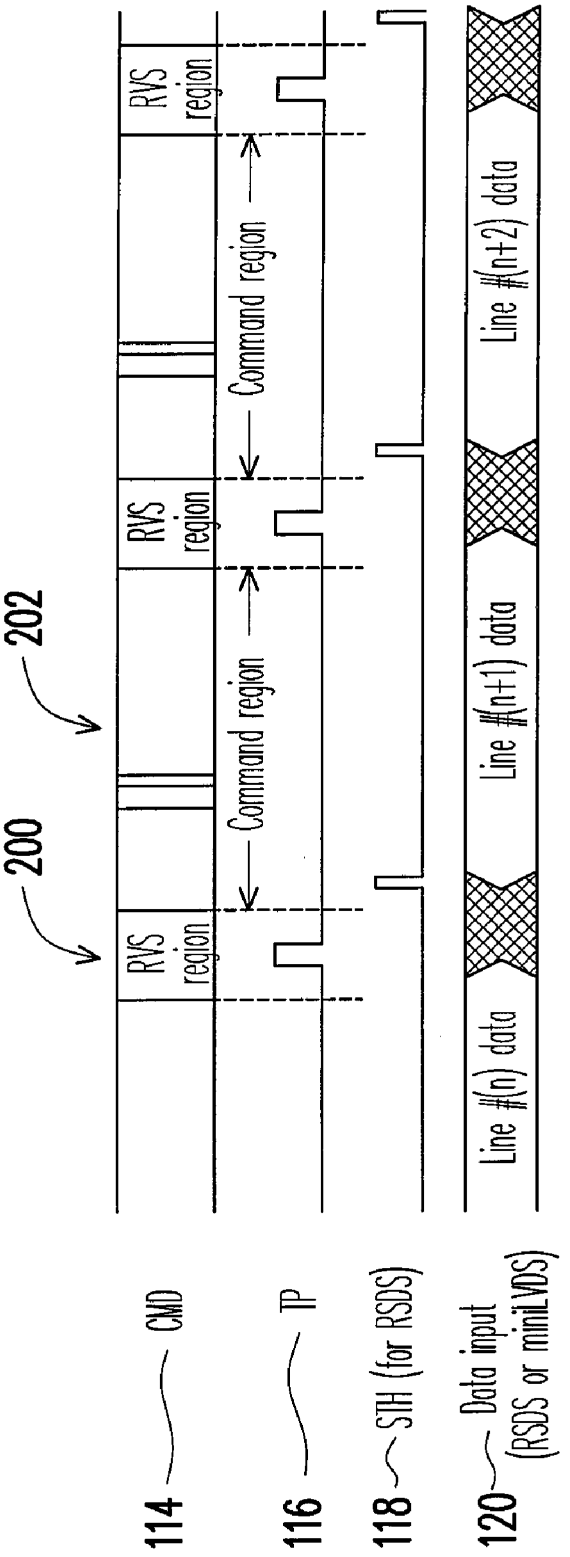
FIG. 3 is a schematic view of a signal time sequence of an impulse-type driving method for an LCD according to an embodiment of the present invention.

FIG. 3 is a schematic view of a signal time sequence of an impulse-type driving method for an LCD according to an embodiment of the present invention. Referring to FIG. 3, a source driver control method of the present invention includes removing the conventional RVS control signal, and adding a command setting signal (CMD) 114. The command setting signal 114 is defined by dividing into a field of determining data voltage polarity, for example, an RVS region 200; and a command field 202. At a time period of the RVS region 200, the CMD signal 114 designates an output voltage polarity. At a time period of the command field 202, the CMD signal 114 is used to set a command. Other control signals, for example, can still apply the conventional RSDS or mini-LVDS control method. Therefore, the TP signal 116 knows the voltage polarity determined by the RVS region 200 at the time period of the RVS region 200. Further for example, in the application of RSDS, the signal STH 118 activates an operation of data input 120 corresponding to the start end of the command field 202, in which the input is performed, for example, by using the data of a scan line line# as a frame.

Figure 4:
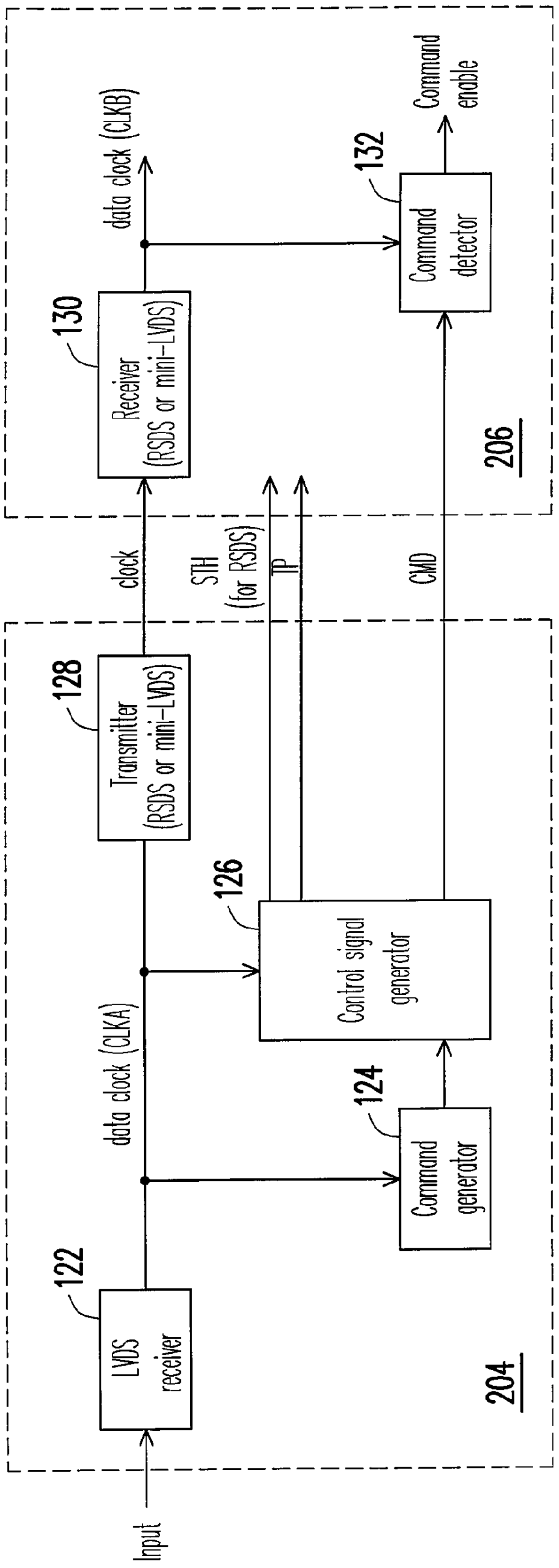
FIG. 4 is a schematic block view of an impulse-type driving circuit for an LCD according to an embodiment of the present invention.

FIG. 4 is a schematic block view of an impulse-type driving circuit for an LCD according to an embodiment of the present invention. Referring to FIG. 4, an architecture of a timing controller 204 and a source driver 206 is described in this embodiment. Generally, the timing controller 204 provides various signals to the source driver and the gate driver. Here, only one of various circuit designs matching the mechanism of the control signals in FIG. 3 is described. As for the timing controller 204, for example, a command generator 124 is added, and the timing controller 204 outputs a command (CMD) signal. Accordingly, the source driver 206 is added with a command detector 132, for sending a corresponding command enable signal when the command detector 132 obtains an effective command.

In detail, the timing controller 204 includes a receiving interface unit (LVDS/RX) 122 for receiving an input data and decoding the input data to obtain a data clock (CLKA). A command circuit unit, for example, includes a command generator 124 and a control signal generator 126, also for receiving the data clock output by the receiving interface unit, so as to generate a set of control signals including the CMD signal to the source driver 206. Further, for example, the data clock output by the receiving interface unit 122 is transmitted to a receiving unit 130 of the source driver 206 through a transmission interface unit 128, so as to obtain the desired data clock for subsequent use. In addition, the input of the command generator 124 in the following embodiments, for example, is generated directly based on the data clock output by the receiving interface unit 122, or based on other clock sources (for example, internal or external clock generation units). That is, in the present invention, it is not limited that the command signal must be generated based on a data clock.

The source driver 206 also includes a command detector 132, for receiving the data clock output by the receiving unit 130 and the CMD signal generated by the control signal generator 126, so as to detect an effective command and generate a corresponding command enable signal.

Figure 5:
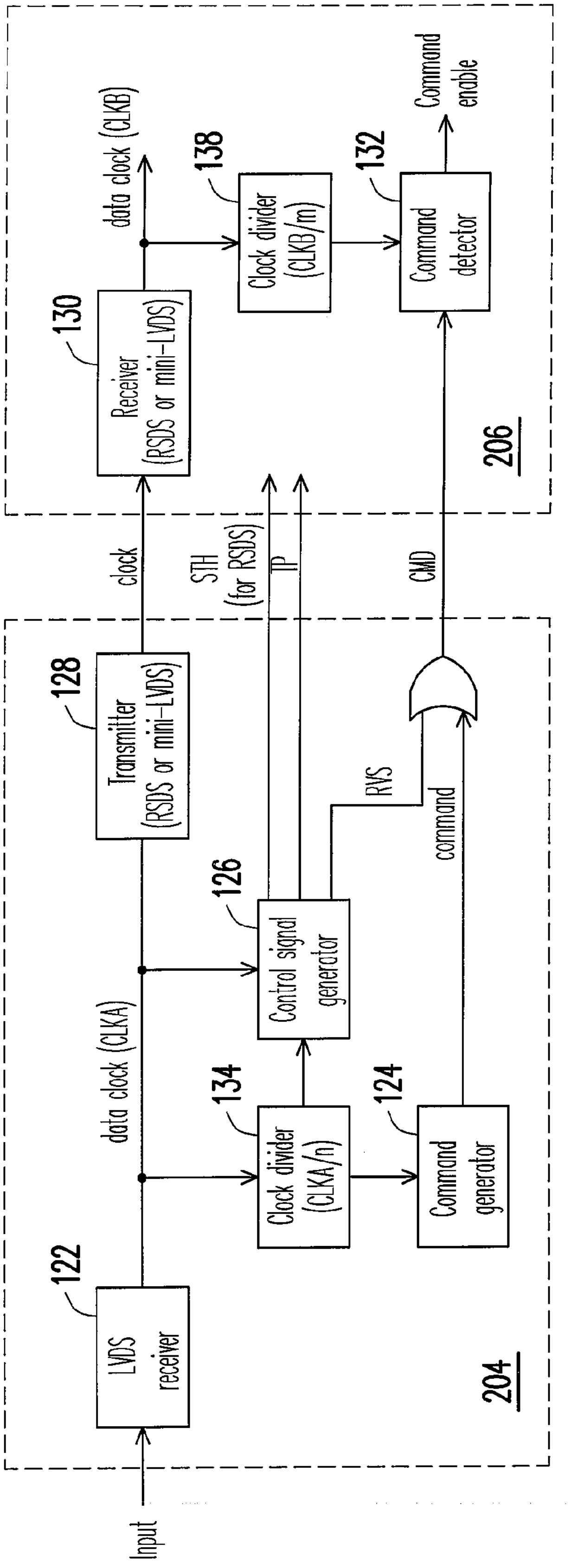
FIG. 5 is a schematic block view of an impulse-type driving circuit for an LCD according to an embodiment of the present invention.

FIG. 5 is a schematic block view of an impulse-type driving circuit for an LCD according to an embodiment of the present invention. Referring to FIG. 5, in this embodiment, another architecture designed for the timing controller 204 and the source driver 206 is described, in which other circuit blocks can operate correspondingly to improve the stability, and the basic design mechanism is the same as the design in FIG. 4.

In this embodiment, for example, in order to prevent command reception error due to over-high frequencies of data transmission clocks CLKA and CLKB, a frequency eliminator, for example, an n times clock divider 134, i.e., CLKA/n, is further added to the timing controller 204 to lower the command transmission frequency. Accordingly, another frequency eliminator, for example, an m times clock divider 138, i.e., CLKB/m, is also added to the source driver 206 to serve as the clock of the command detector 132, in which, for example, $n \geqq m$, such that the command content is sampled by the source driver 206 at a high frequency. As for the command circuit unit of the timing controller 204, for example, an OR logic operation is performed on the CMD signal output by the command generator 124 and the RVS generated by the control signal generator 126, so as to output the CMD signal or RVS signal at the corresponding field. Of course, the OR logic operation can be replaced by other equivalent circuits.

Figure 6:
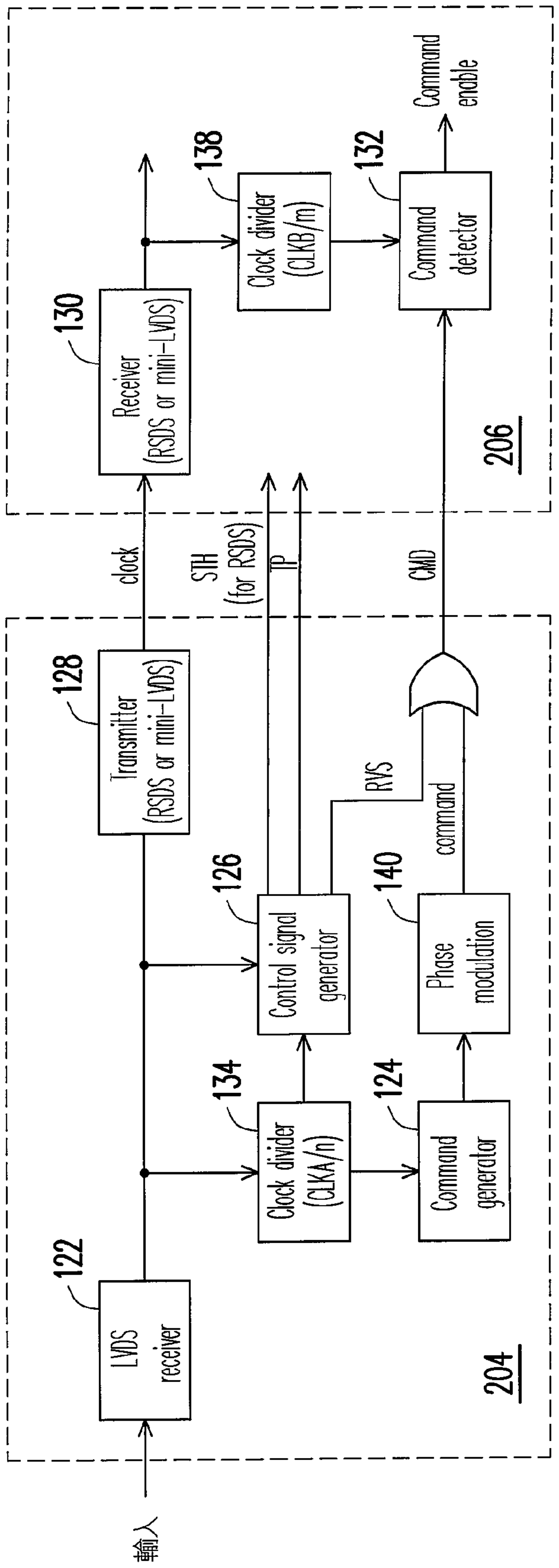
FIG. 6 is a schematic block view of an impulse-type driving circuit for an LCD according to an embodiment of the present invention.

FIG. 6 is a schematic block view of an impulse-type driving circuit for an LCD according to an embodiment of the present invention. Referring to FIG. 6, in this embodiment, firstly, another design architecture of the timing controller 204 and the source driver 206 is described. Compared with the circuit of FIG. 5, for example, in order to adjust the system transmission delay, this embodiment further adds a phase modulator 140 capable of modulating a command, so as to ensure the accuracy of command reception for the source driver.

Figure 7:
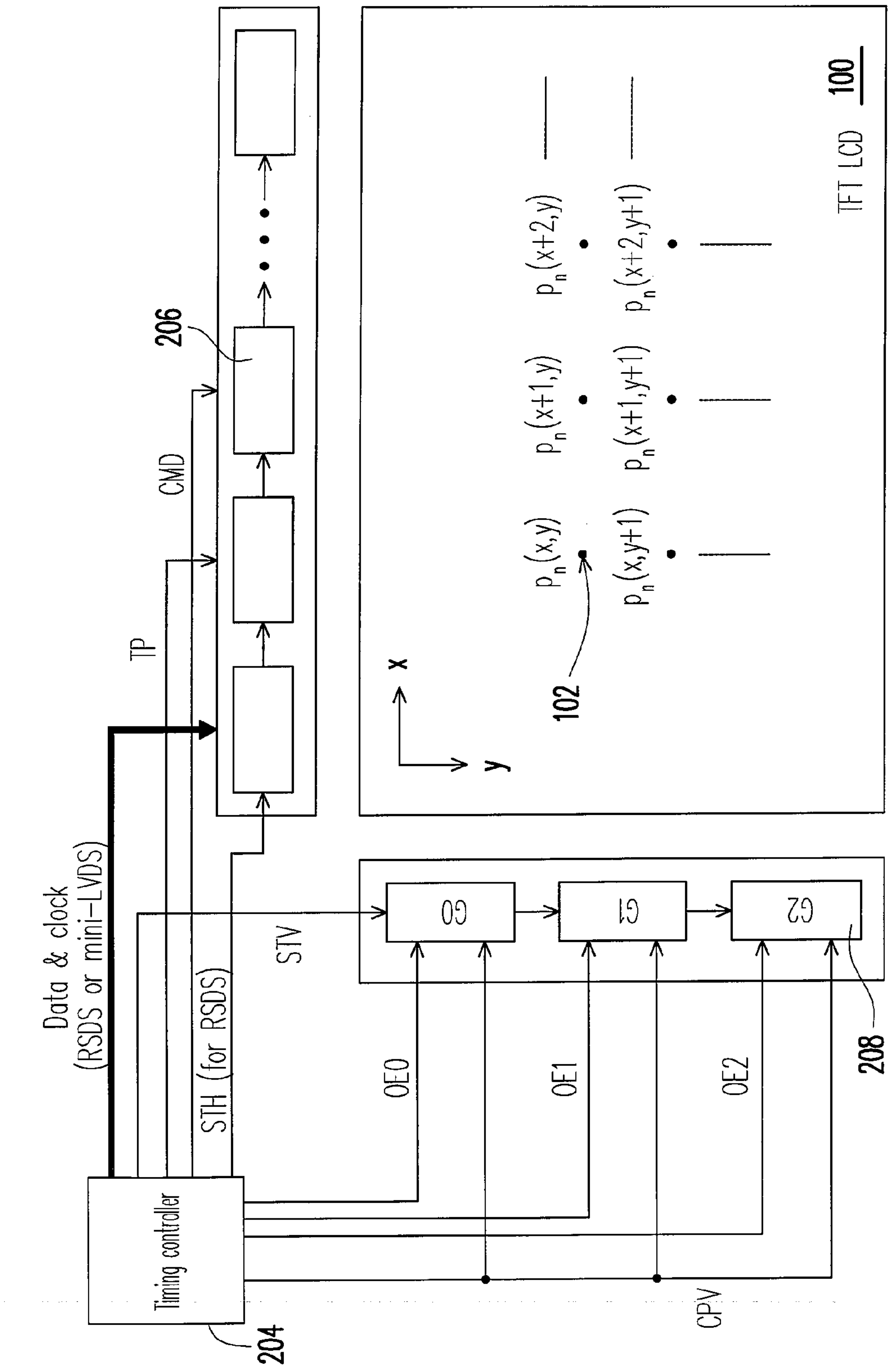
FIG. 7 is a schematic view showing the architecture of a panel system of a TFT LCD according to an embodiment of the present invention.

FIG. 7 is a schematic view showing the architecture of a panel system of a TFT LCD according to an embodiment of the present invention. Referring to FIG. 7, the pixels of the display panel 100 can be driven by the timing controller 204 and the source driver 206. However, for example, the driving manner between the gate driver 208 and the timing controller 204 can be modified. Taking three gate drivers 208 as an example, the gate drivers 208 are controlled by three output enables OE1, OE2, and OE3 through the timing controller 204 respectively. The number of the gate driver 208 is set according to actual requirements. That is, the interface of the timing controller and the source driver applies the newly provided command-type architecture.

Figure 8:
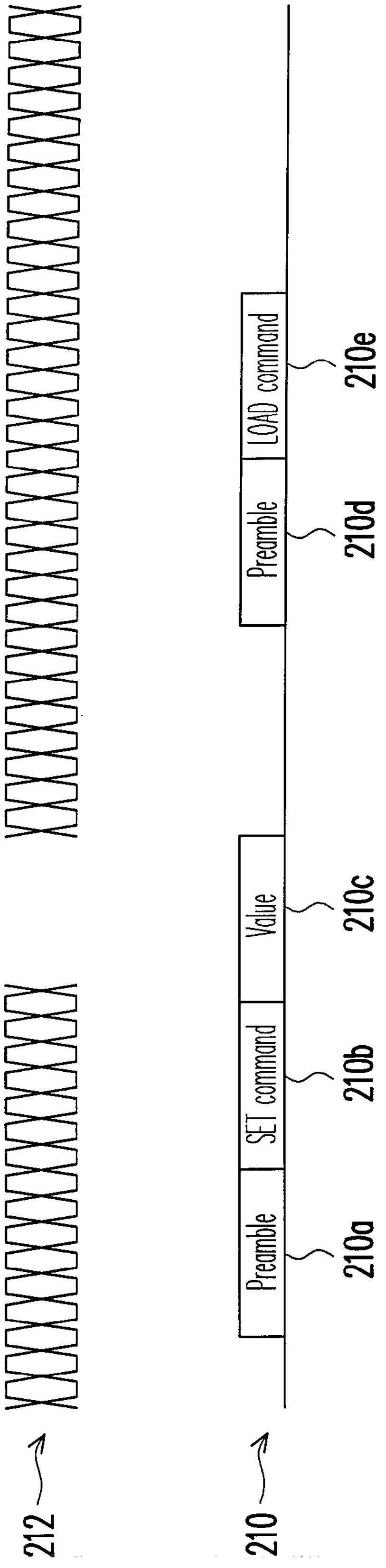
FIG. 8 is a schematic view of a command protocol according to an embodiment of the present invention.

FIG. 8 is a schematic view of a command protocol according to an embodiment of the present invention. A clock 212 of the command detector 132 in the source driver may be, for example, an RSDS clock, a mini-LVDS clock, or a clock output by a frequency eliminator. The command protocol 210, for example, may transmit a SET command 210*b* and a LOAD command 210*e* respectively following preambles 210*a* and 210*d*, or with no preamble. A setting value 210*c*, following the SET command 210*b*, serves as a corresponding value of a designated output voltage of the LOAD command 210*e*, and may also include polarity. The command protocol may be various commands in proper forms, and is not limited herein. The CMD signal of the present invention allows to define and send different commands upon various demands, that is, dynamic commands can be sent and modified according to actual requirements without sticking to certain specification.

Figure 9:
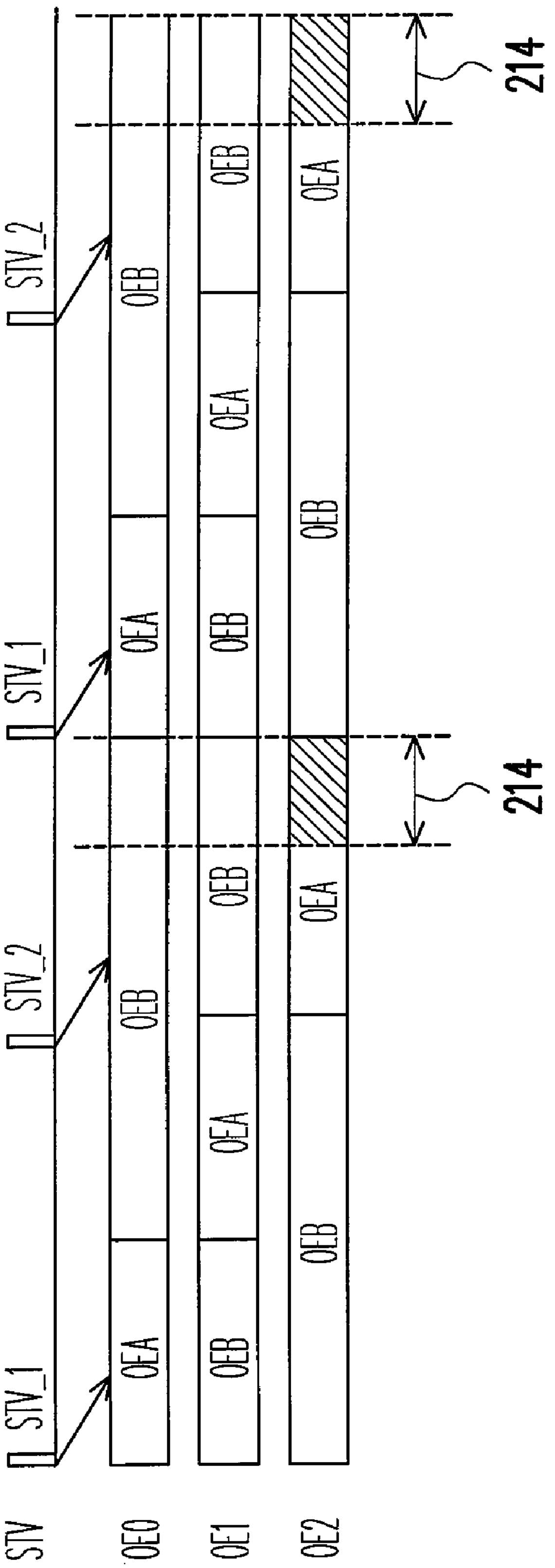
FIG. 9 is a schematic view of a gate driving manner adopted by the architecture of FIG. 7 according to an embodiment of the present invention.

FIG. 9 is a schematic view of a gate driving manner adopted by the architecture of FIG. 7 according to an embodiment of the present invention. As for the vertical synchronous signal STV of the present invention, for example, another vertical synchronous impulse STV_2 is inserted between the frame periods of two conventional vertical synchronous impulses STV_1, and the three gate drivers are respectively controlled by the output enable signals OE1, OE2, and OE3. Each of the output enable signals OE1, OE2, and OE3 has two regions of OEA and OEB corresponding to the vertical synchronous impulse STV_1 and the vertical synchronous impulse STV_2 in each frame period. In this manner, the vertical synchronous impulse STV_1, when transmitted to the gate driver, is corresponding to OEA, and is, for example, enabled when the picture content is transmitted. In addition, the vertical synchronous impulse STV_2, when transmitted to the gate driver, is corresponding to OEB, and is, for example, enabled when the voltage value is set. That is, STV_1 is corresponding to OEA, and STV_2 is corresponding to OEB. Each frame period, for example, also has a blank region 214 leading to no operation.

Figure 10:
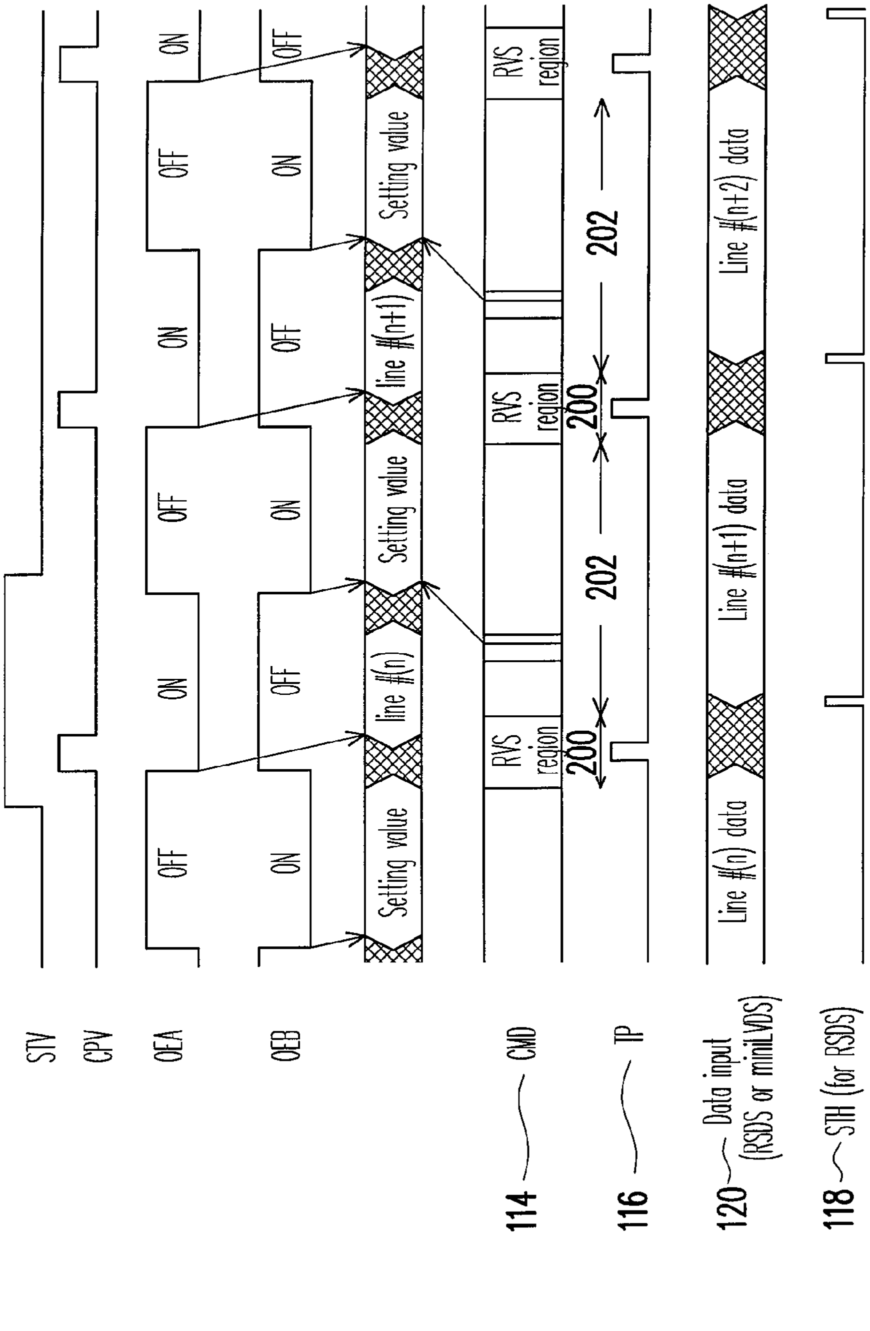
FIG. 10 is a schematic view showing a driving waveform adopted by the provided driving mechanism according to an embodiment of the present invention.

FIG. 10 is a schematic view showing a driving waveform adopted by the provided driving mechanism according to an embodiment of the present invention. For example, the output enable signals OEA and OEB at a low level output enables (also possible at inverse phases). The TP impulse 116, for example, adopts the conventional manner, with reference to the RVS field 200 of the CMD signal 114, to make the source driver sequentially output scan lines line#(0), line#(1), line#(2) . . . as well as other data, and outputs enables together with the OEA signal. However, before the data is maintained at the next TP116, the source driver receives the effective command 202, and then the source driver outputs the set voltage (setting value) to output enables together with the OEB signal. OEA and OEB respectively control different gate drivers, such that the transmitted picture content and the setting value are written into different positions of the display. The RSDS or mini-LVDS data 120 and the horizontal synchronous (STH) signal 118 used for RSDS can be input according to a common time sequence.

Figure 11:
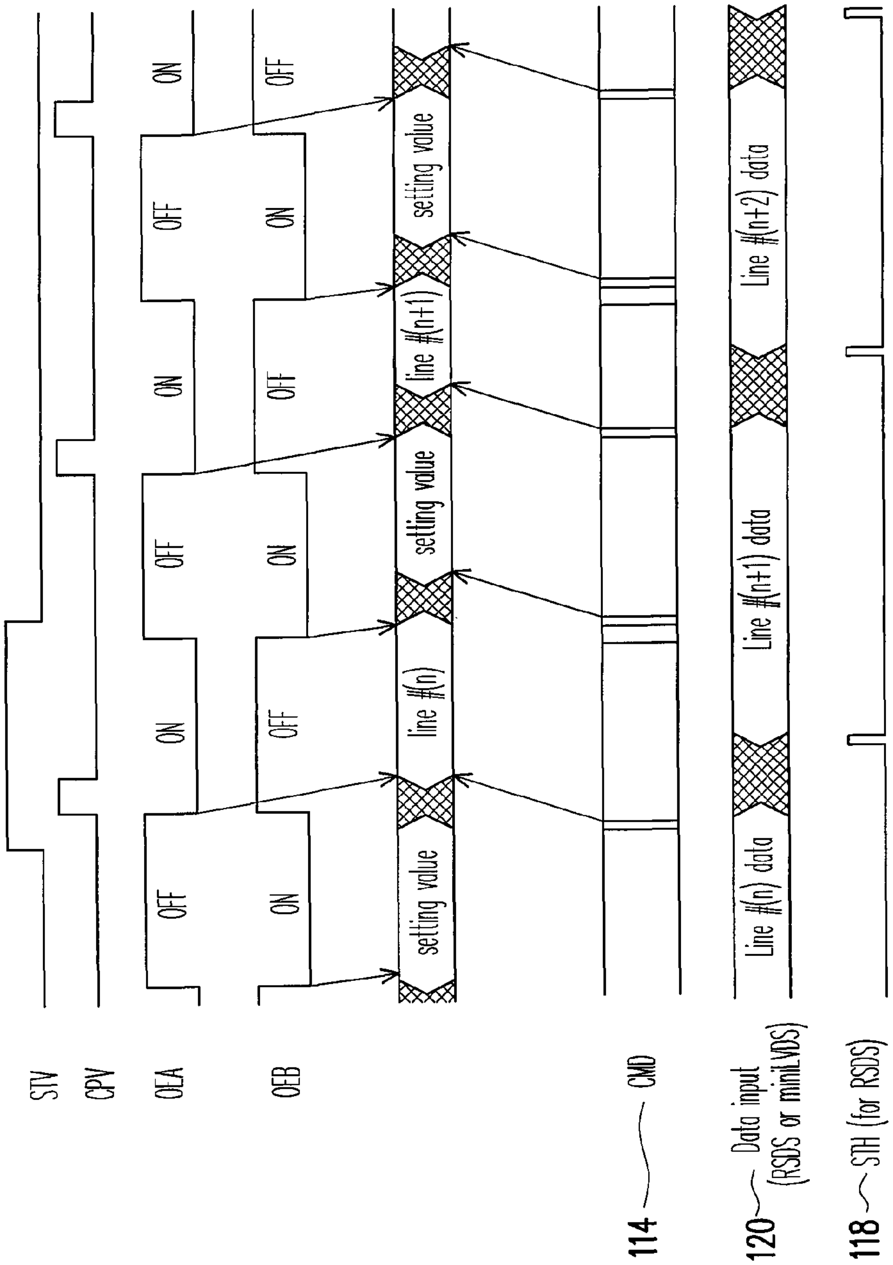
FIG. 11 is a schematic view showing another driving waveform adopted by the provided driving mechanism according to an embodiment of the present invention.

FIG. 11 is a schematic view showing another driving waveform adopted by the provided driving mechanism according to an embodiment of the present invention. Referring to FIG. 11, it is similar to the method in FIG. 10, but the conventional TP signal, i.e., the voltage output control impulse, is integrated into the CMD signal 114. As such, the CMS signal 114 re-defines more types of commands, for example, including the voltage output control, which is used to replace the TP signal and contains polarity designation. For example, according to the mechanism, a command corresponding to the regions of line#(0, 1, . . . ) is used to designate a transmitted picture content output. In addition, another command corresponding to the "setting value" section is used to designate a setting voltage value output. In addition, the CMD signal of the present invention can define various types of commands to satisfy more control demands.

Figure 12:
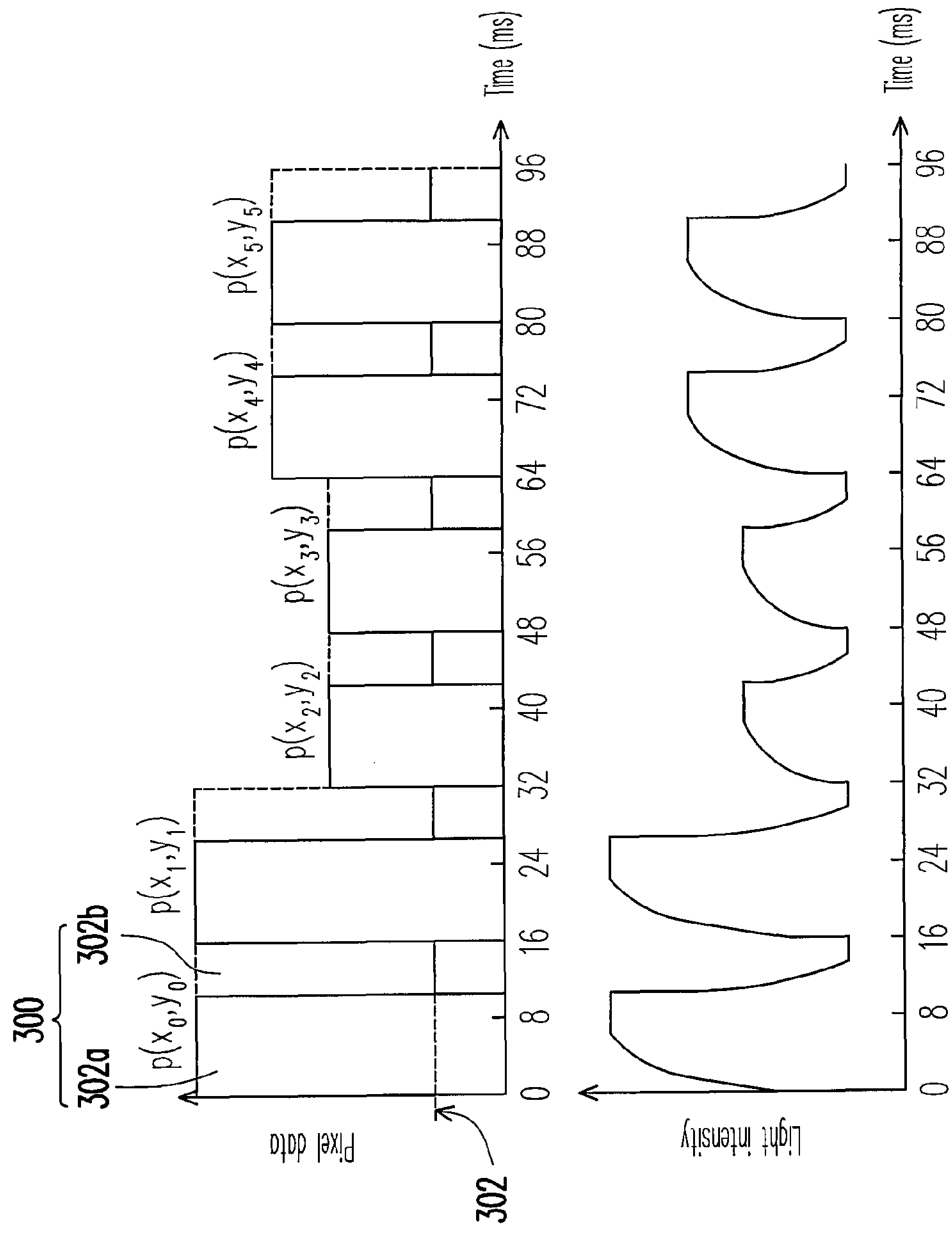
FIG. 12 is a schematic view showing an actual application by adopting a CMD signal mechanism according to an embodiment of the present invention.

FIG. 12 is a schematic view showing an actual application by adopting a CMD signal mechanism according to an embodiment of the present invention. For example, the pixel value in each frame period may not be maintained to the next updated pixel value. Taking a frame period 300 of 16 m as an example, the brightness of the pixel is corresponding to the pixel value $p(x_0, y_0)$ of a real image at the time of 300*a*, and is a fixed small pixel setting value 302 at the time of 300*b*. The pixel setting value 302 is set by the command region of the CMD signal. Due to variations of the pixel value, the display brightness varies accordingly, thereby achieving a display mode similar to the impulse-type. Of course, through the CMD signal mechanism, the present invention allows to have more driving manners, and FIG. 12 merely shows one embodiment which is not the only application.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An impulse-type driving method for a liquid crystal display (LCD), used for driving a pixel array of an LCD panel, comprising:

providing a set of impulse control signals to a source driver, wherein the source driver drives the pixel array according to the set of impulse control signals, the set of impulse control signals comprise a command signal, and the command signal further comprises:

a field of determining data voltage polarity, for providing a polarity data for determining a voltage polarity output by the source driver according to a time sequence; and a command field, alternatively output with the field of determining data voltage polarity, wherein the command field allows to add a dynamic command in accordance with a desired action, wherein the dynamic command is not a specific command constantly required for inputting to the source driver.

2. The impulse-type driving method for an LCD according to claim 1, wherein a time point of the field of determining data voltage polarity is corresponding to a voltage output control signal (TP) of the source driver.

3. The impulse-type driving method for an LCD according to claim 2, wherein the command field is located between two adjacent fields of determining data voltage polarity.

4. The impulse-type driving method for an LCD according to claim 1, wherein the field of determining data voltage polarity is a dependent signal input.

5. The impulse-type driving method for an LCD according to claim 1, wherein the command signal further comprises:

a voltage output control field, for controlling the source driver to output an image data.

6. The impulse-type driving method for an LCD according to claim 1, wherein the command field is used to set display brightness adjustment for a plurality of pixels in the pixel array respectively.

7. The impulse-type driving method for an LCD according to claim 1, further comprising:

providing an output enable signal to a gate driver respectively, wherein the output enable signal comprises a first output enable and a second output enable to be alternatively output; and providing a vertical synchronous signal to the gate driver, wherein the vertical synchronous signal comprises a first vertical synchronous signal and a second vertical synchronous signal in a frame in accordance with a time sequence of the first output enable and the second output enable.

8. The impulse-type driving method for an LCD according to claim 7, wherein the first output enable works when a picture content is transmitted, and the second output enable works when a voltage value is set.

9. An impulse-type driving circuit for an LCD, used for driving a pixel array of an LCD panel, comprising:

a timing controller, for providing a set of control signals comprising a clock signal, a voltage output control signal (TP) of a source driver, and a command signal, wherein the command signal comprises:

a field of determining data voltage polarity, for providing a polarity data for determining a voltage polarity output by the source driver according to a time sequence;

a command field, alternatively output with the field of determining data voltage polarity, wherein the command field allows to add a dynamic command in accordance with a desired action, wherein the dynamic command is not a specific command constantly required for inputting to the source driver; and a source driver, for receiving the set of control signals, and unpacking the command signal to execute corresponding operations.

10. The impulse-type driving circuit for an LCD according to claim 9, wherein the timing controller comprises:

a receiving interface unit, for receiving an input data, and decoding the input data to obtain a data clock of the set of control signals; and a command circuit unit, for receiving the data clock or another clock to generate the set of control signals containing the command signal, wherein the source driver comprises:

a receiving interface unit, for receiving the data clock transmitted by the timing controller for subsequent use; and a command detector, for receiving the data clock and the command signal to generate a command enable signal.

11. The impulse-type driving circuit for an LCD according to claim 9, wherein the command circuit unit of the timing controller comprises:

a command generator, for receiving the data clock, to generate a command content; and a control signal generator, for receiving the data clock and the command content, so as to correspondingly generate the command signal to the source driver.

12. The impulse-type driving circuit for an LCD according to claim 9, wherein the command circuit unit of the timing controller comprises:

a first clock divider, for dividing the data clock by a first parameter, to obtain a first down-conversion clock;

a command generator, for receiving the first down-conversion clock, to generate a command content;

a control signal generator, for receiving the data clock to at least generate a data voltage polarity signal correspondingly; and a logic unit, for receiving the command content and the data voltage polarity signal, and outputting the command signal after combination.

13. The impulse-type driving circuit for an LCD according to claim 12, wherein the command detector of the source driver further comprises a second clock divider for dividing the received data clock by a second parameter, so as to obtain a second down-conversion clock as a basis for generating the command enable signal.

14. The impulse-type driving circuit for an LCD according to claim 13, wherein the first parameter is greater than or equal to the second parameter.

15. The impulse-type driving circuit for an LCD according to claim 9, wherein the command circuit unit of the timing controller comprises:

a first clock driver, for dividing the data clock by a first parameter, so as to obtain a first down-conversion clock;

a command generator, for receiving the first down-conversion clock, to generate a command content;

a phase modulator, for performing a phase modulation on the command content;

a control signal generator, for receiving the data clock to at least generate a data voltage polarity signal correspondingly; and a logic unit, for receiving the command content output by the phase modulator and the data voltage polarity signal output by the control signal generator, and outputting the command signal after combination.

16. The impulse-type driving circuit for an LCD according to claim 15, wherein the command detector of the source driver further comprises a second clock divider for dividing the received data clock by a second parameter, so as to obtain a second down-conversion clock as a basis for generating the command enable signal.

17. The impulse-type driving circuit for an LCD according to claim 16, wherein the first parameter is greater than or equal to the second parameter.

18. The impulse-type driving circuit for an LCD according to claim 9, wherein a time point of the field of determining data voltage polarity is corresponding to the TP signal of the source driver.

19. The impulse-type driving circuit for an LCD according to claim 18, wherein the command field is located between two adjacent fields of determining data voltage polarity.

20. The impulse-type driving circuit for an LCD according to claim 9, wherein the field of determining data voltage polarity is a dependent signal input.

21. The impulse-type driving circuit for an LCD according to claim 9, wherein the command signal further comprises:

a voltage output control field, for controlling the source driver to output an image data.

22. The impulse-type driving circuit for an LCD according to claim 9, wherein the command field is used to set display brightness adjustment for a plurality of pixels in the pixel array respectively.

23. The impulse-type driving circuit for an LCD according to claim 9, wherein the timing controller further provides:

an output enable signal to a gate driver respectively, wherein the output enable signal comprises a first output enable and a second output enable to be alternatively output; and a vertical synchronous signal to the gate driver, wherein the vertical synchronous signal comprises a first vertical synchronous signal and a second vertical synchronous signal in a frame in accordance with a time sequence of the first output enable and the second output enable.

24. The impulse-type driving circuit for an LCD according to claim 23, wherein the first output enable works when a picture content is transmitted, and the second output enable works when a voltage value is set.

* * * * *